United States Patent
Nakade

(10) Patent No.: US 10,668,940 B2
(45) Date of Patent: Jun. 2, 2020

(54) CONTROL APPARATUS FOR VEHICLE

(71) Applicant: Toyota Jidosha Kabushiki Kaisha, Toyota-shi (JP)

(72) Inventor: Yusuke Nakade, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 41 days.

(21) Appl. No.: 15/958,374

(22) Filed: Apr. 20, 2018

(65) Prior Publication Data

US 2018/0312190 A1    Nov. 1, 2018

(30) Foreign Application Priority Data

Apr. 28, 2017 (JP) ................. 2017-089992

(51) Int. Cl.
*F16H 61/12* (2010.01)
*F16H 61/18* (2006.01)
(Continued)

(52) U.S. Cl.
CPC ............ *B62D 1/286* (2013.01); *B60W 30/06* (2013.01); *B60W 50/12* (2013.01); *B62D 15/0285* (2013.01); *F16H 61/0213* (2013.01); *F16H 61/12* (2013.01); *F16H 61/18* (2013.01); *B60W 2520/06* (2013.01); *B60W 2540/16* (2013.01);
(Continued)

(58) Field of Classification Search
None
See application file for complete search history.

(56) References Cited

U.S. PATENT DOCUMENTS

2009/0160628 A1* 6/2009 Baynard ............... B60Q 9/006
340/425.5
2010/0318255 A1* 12/2010 Li .......................... B60T 8/172
701/31.4
(Continued)

FOREIGN PATENT DOCUMENTS

EP      0 037 639 A2    10/1981
JP      5-272632        10/1993

OTHER PUBLICATIONS

EP 18169881.2 Written Opinion (Year: 2019).*
Ep 18169881.2 Search Report (Year: 2019).*

*Primary Examiner* — Colby M Hansen
(74) *Attorney, Agent, or Firm* — Oblon, McClelland, Maier & Neustadt, L.L.P.

(57) ABSTRACT

A control apparatus for a vehicle provided with drive wheels, an automatic transmission, and a manual shifting device for shifting the automatic transmission, the control apparatus includes an automatic parking control portion configured to implement an automatic parking control for automatically parking the vehicle in a predetermined parking space, and controls the automatic transmission to be shifted according to a shifting control signal corresponding to an operation of the manual shifting device, the automatic parking control portion comprising a shifting control portion configured to place the automatic transmission in a power-cutoff state in which a vehicle drive force is not transmitted to the drive wheels, when the manual shifting device is operated to a position a running direction in which is different from a running direction of the vehicle when the automatic parking control is implemented.

9 Claims, 5 Drawing Sheets

(51) Int. Cl.
*B60W 30/06* (2006.01)
*B60W 50/12* (2012.01)
*B62D 1/28* (2006.01)
*F16H 61/02* (2006.01)
*B62D 15/02* (2006.01)
*F16H 61/16* (2006.01)
*F16H 59/44* (2006.01)

(52) U.S. Cl.
CPC ..... *B60W 2710/1005* (2013.01); *F16H 61/16* (2013.01); *F16H 2059/443* (2013.01); *F16H 2061/1232* (2013.01); *F16H 2061/168* (2013.01); *F16H 2312/12* (2013.01)

(56) References Cited

U.S. PATENT DOCUMENTS

| | | | |
|---|---|---|---|
| 2011/0057814 A1* | 3/2011 | Park | B60W 10/18 340/932.2 |
| 2014/0024494 A1 | 1/2014 | Inoue et al. | |
| 2015/0375740 A1* | 12/2015 | Okamura | B60W 30/06 701/25 |
| 2016/0075326 A1* | 3/2016 | Kiyokawa | B60W 30/06 701/41 |

* cited by examiner

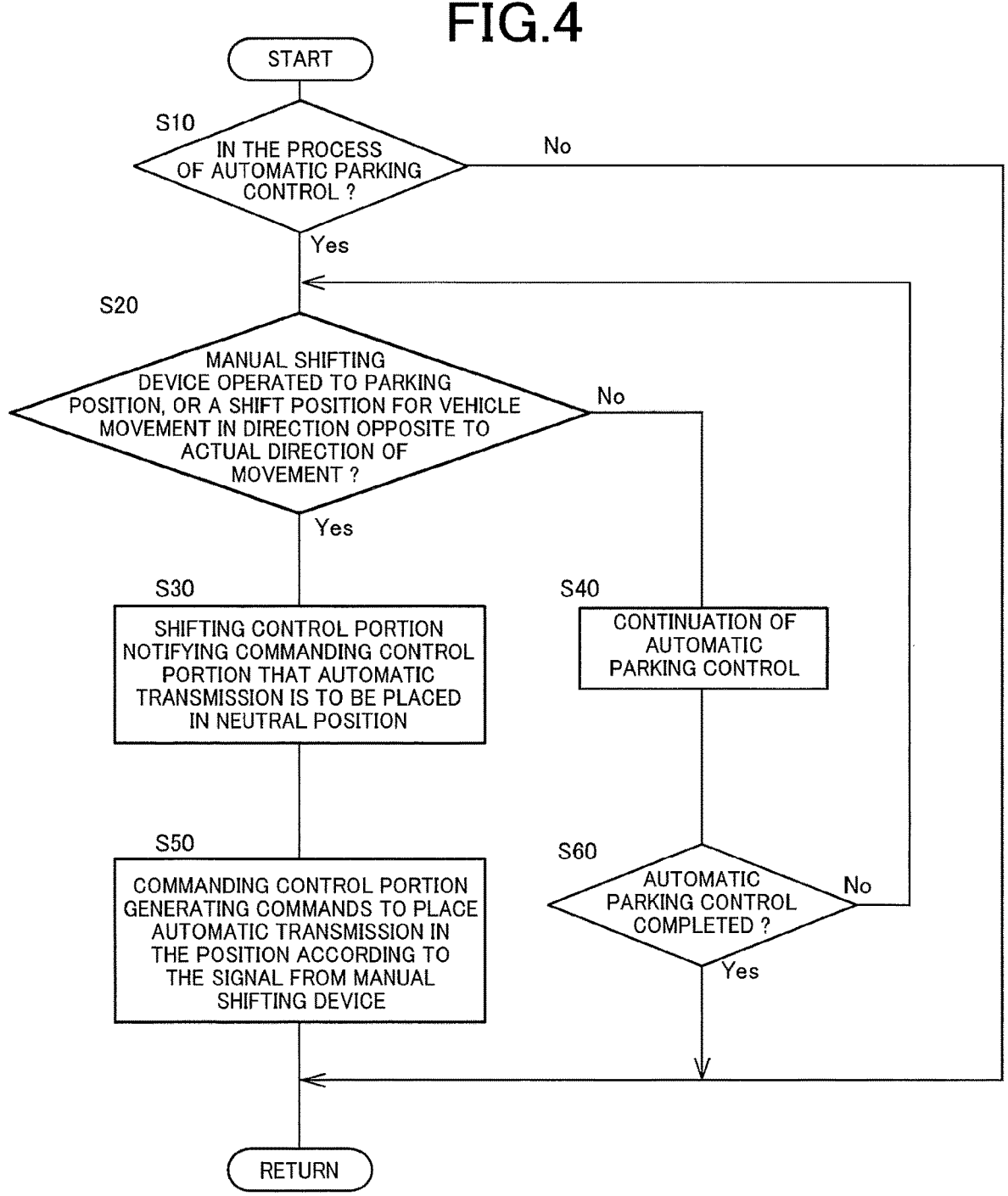

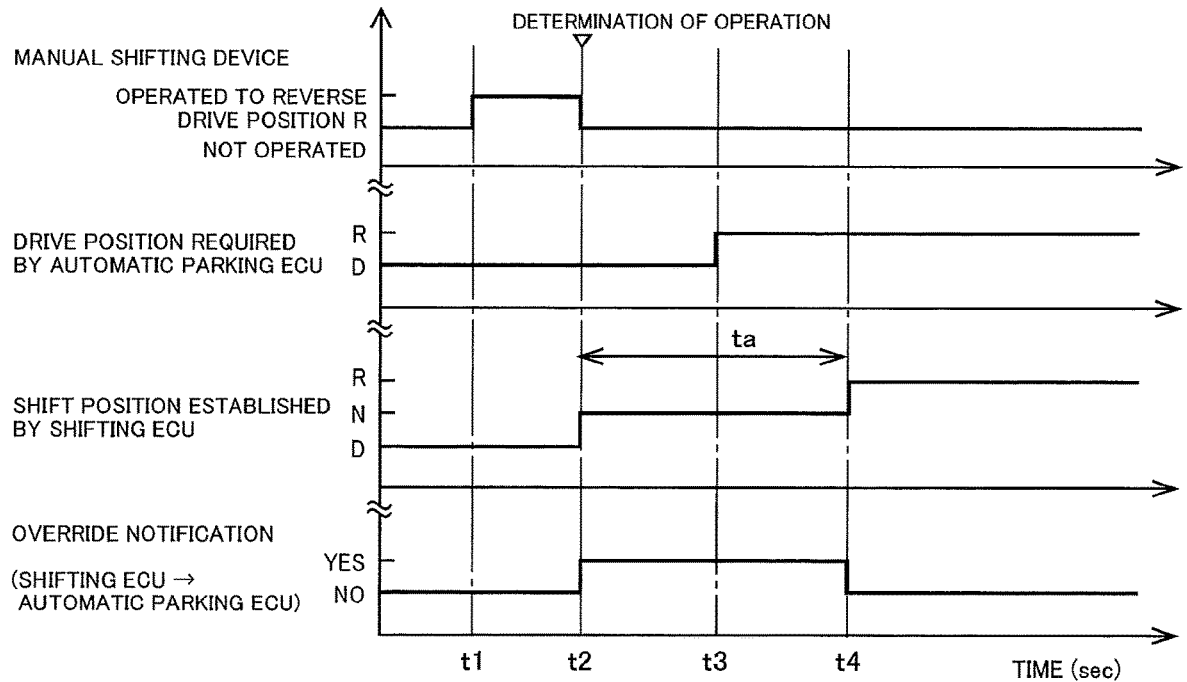
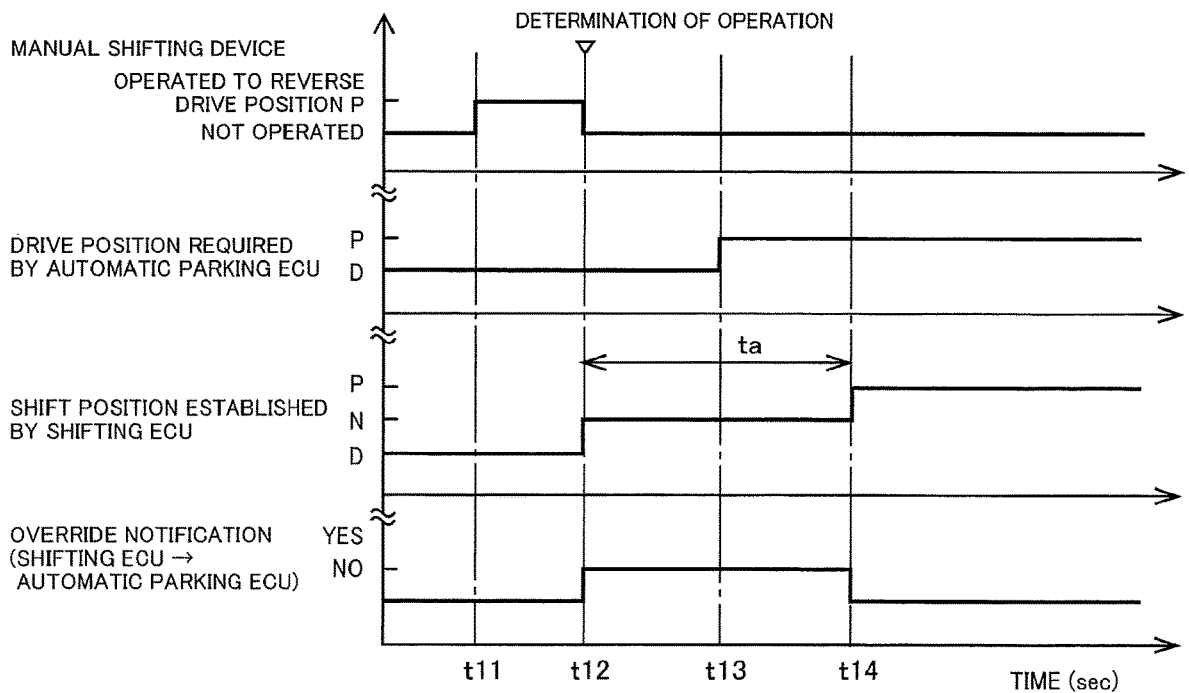

CONTROL APPARATUS FOR VEHICLE

This application claims priority from Japanese Patent Application No. 2017-089992 filed on Apr. 28, 2017, the disclosure of which is herein incorporated by reference in its entirety.

FIELD OF THE INVENTION

The present invention relates in general to a vehicle provided with an automatic parking control device configured to automatically park the vehicle in a predetermined position in a parking space, without an operation of a steering wheel, a manual shifting device for shifting an automatic transmission, a foot brake and an accelerator pedal by an operator of the vehicle, and more particularly to a technique to reduce a shock to be generated upon an operation of the manual shifting device by an operator of the vehicle, in the process of an automatic parking control, to a parking position or to a shift position for driving the vehicle in a direction opposite to a direction of movement during the automatic parking control of the vehicle.

BACKGROUND OF THE INVENTION

There is known a control apparatus for a vehicle, which is configured to implement an automatic parking control of the vehicle and to determine whether an automatic transmission should be shifted according to an operation of a manual shifting device by an operator of the vehicle in the process of the automatic parking control to a shift position for driving the vehicle in a direction opposite to a direction of movement during the automatic parking control. JP-5-272632A discloses an example of a vehicular control device, which is configured to establish an automatic parking control mode when the manual shifting device is operated to a parking position, and to shift the automatic transmission to a shift position selected by the manual shifting device where a foot brake is operated when the manual shifting device is operated from the parking position to the shift position in the process of the automatic parking control, or to continue the automatic parking control where the foot brake is not operated. This vehicular control device can prevent behaviors of the vehicle contrary to an intention of the vehicle operator in the event of an erroneous operation of the manual shifting device by the vehicle operator.

SUMMARY OF THE INVENTION

Where the foot brake is not operated, however, there is a risk of failure to avoid a state of emergency of the vehicle, contrary to an intention of the vehicle operator who has operated the manual shifting device, for the purpose of avoiding the state of emergency, to the shift position for driving the vehicle in a direction opposite to a direction of movement of the vehicle during the automatic parking control, for example, to a forward drive position "D" during a reverse movement of the vehicle in the process of the automatic parking control, or to a reverse drive range "R" during a forward movement of the vehicle in the process of the automatic parking control. Where the foot brake is operated when the manual shifting device is operated to the shift position for driving the vehicle in the direction opposite to the direction of movement during the automatic parking control, there is a risk of generation of a shock upon an operation of the manual shifting device in the process of the automatic parking control, and a low degree of drivability of the vehicle as felt by the vehicle operator.

The present invention was made in view of the background art described above. It is therefore an object of the present invention to provide a control apparatus provided with an automatic transmission, and a manual shifting device for shifting the automatic transmission, which control apparatus permits not only easy avoidance of a state of emergency of the vehicle by shifting the automatic transmission according to an operation of the manual shifting device, in the process of an automatic parking control, to the parking position, or to the shift position for driving the vehicle in the direction opposite to the direction of movement during the automatic parking control, but also reduction of generation of a shock upon an operation of the manual shifting device.

The object indicated above is achieved according to the following modes of the present invention:

According to a first mode of the invention, there is provided a control apparatus for a vehicle provided with drive wheels, an automatic transmission, and a manual shifting device for shifting the automatic transmission, the control apparatus including an automatic parking control portion configured to implement an automatic parking control for automatically parking the vehicle in a predetermined parking space, and controlling the automatic transmission to be shifted according to a shifting control signal corresponding to an operation of the manual shifting device, the automatic parking control portion comprising a shifting control portion configured to place the automatic transmission in a power-cutoff state in which a vehicle drive force is not transmitted to the drive wheels, when the manual shifting device is operated to a position a running direction in which is different from a running direction of the vehicle when the automatic parking control is implemented.

According to a second mode of the invention, the control apparatus according the first mode of the invention is configured such that the shifting control portion commands the automatic transmission to be placed in a running position or a parking position according to the shifting control signal corresponding to the operation of the manual shifting device, after the automatic transmission is once placed in the power-cutoff state.

According to a third mode of the invention, the control apparatus according to the first or second mode of the invention is configured such that the shifting control portion controls a shifting device including a shift actuator configured to shift the automatic transmission, and the automatic parking control portion further comprises a commanding control portion configured to control the shifting control portion. The shifting control portion commands the shifting device to place the automatic transmission in a neutral position when the manual shifting device is operated to a shift position for driving the vehicle in a direction opposite to a direction of movement of the vehicle during the automatic parking control implemented under the control of the automatic parking control portion. The commanding control portion then requires the shifting control portion to command the shifting device to shift the automatic transmission to a drive position corresponding to the shift position of the manual shifting device, and the shifting control portion then commands the shifting device to shift the automatic transmission to the above-indicated drive position.

According to a fourth mode of the invention, the control apparatus according to any one of the first through third modes of the invention is configured such that the shifting control portion controls a shifting device including a shift actuator configured to shift the automatic transmission, and the automatic parking control portion further comprises a commanding control portion configured to control the shifting control portion. The shifting control portion commands the shifting device to place the automatic transmission in a neutral position when the manual shifting device is operated from a non-parking position to a parking position during the automatic parking control implemented under the control of the automatic parking control portion. Then, the commanding control portion requires the shifting control portion to command the shifting device to shift the automatic transmission to a parking position corresponding to the parking position of the manual shifting device, and the shifting control portion then commands the shifting device to shift the automatic transmission to the above-indicated parking position.

The control apparatus according to the first mode of the invention includes the automatic parking control portion configured to implement the automatic parking control for automatically parking the vehicle in the predetermined parking space, and controls the automatic transmission to be shifted according to the shifting control signal corresponding to the operation of the manual shifting device. The automatic parking control portion comprises the shifting control portion configured to place the automatic transmission in the power-cutoff state in which the vehicle drive force is not transmitted to the drive wheels, when the manual shifting device is operated to the position the running direction in which is different from the running direction of the vehicle when the automatic parking control is implemented. According to this first mode of the invention, it is possible to not only execute an emergency action based on the operation of the manual shifting device by the driver, and but also reduce generation of a shock upon the operation of the manual shifting device.

According to the second mode of the invention, the shifting control portion commands the automatic transmission to be placed in the running position or the parking position according to the shifting control signal corresponding to the operation of the manual shifting device, after the automatic transmission is once placed in the power-cutoff state. In this second mode of the invention, it is possible to not only avoid the state of emergency of the vehicle according to the operation of the manual shifting device by the vehicle operator, and but also reduce the generation of the shock upon the operation of the manual shifting device.

According to the third mode of the invention, the shifting control portion controls the shifting device including the shift actuator configured to shift the automatic transmission, and the automatic parking control portion further comprises the commanding control portion configured to control the shifting control portion. The shifting control portion commands the shifting device to place the automatic transmission in the neutral position when the manual shifting device is operated to a shift position for driving the vehicle in the direction opposite to the direction of movement of the vehicle during the automatic parking control implemented under the control of the automatic parking control portion. Then, the commanding control portion requires the shifting control portion to command the shifting device to shift the automatic transmission to the drive position corresponding to the shift position of the manual shifting device, and the shifting control portion then commands the shifting device to shift the automatic transmission to the above-indicated drive position. In this third mode of the invention, it is possible to not only avoid the state of emergency of the vehicle according to the operation of the manual shifting device by the vehicle operator, but also reduce the generation of the shock upon the operation of the manual shifting device.

According to the fourth mode of the invention, the shifting control portion controls the shifting device including the shift actuator configured to shift the automatic transmission, and the automatic parking control portion further comprises the commanding control portion configured to control the shifting control portion. The shifting control portion commands the shifting device to place the automatic transmission in the neutral position when the manual shifting device is operated from the non-parking position to the parking position during the automatic parking control implemented under the control of the automatic parking control portion. Then, the commanding control portion requires the shifting control portion to command the shifting device to shift the automatic transmission to a parking position corresponding to the parking position of the manual shifting device, and the shifting control portion then commands the shifting device to shift the automatic transmission to the above-indicated parking position. In this fourth mode of the invention, it is possible to not only avoid the state of emergency of the vehicle according to the operation of the manual shifting device by the vehicle operator, but also reduce the generation of the shock upon the operation of the manual shifting device.

BRIEF DESCRIPTION OF THE DRAWINGS

FIG. 4 is a flow chart illustrating a control routine executed in the process of the automatic parking control, to deal with an operation of a manual shifting device to a parking position, or to a shift position for driving the vehicle in a direction opposite to a direction of movement of the vehicle during the automatic parking control;

FIG. 5 is a time chart indicating various signals generated from the electronic control device when the manual shifting device is operated during the automatic parking control of FIG. 4, to the shift position for driving the vehicle in the direction opposite to the direction of movement of the vehicle during the automatic parking control; and FIG. 6 is a time chart indicating the various signals generated from the electronic control device when the manual shifting device is operated to the parking position during the automatic parking control of FIG. 4.

DETAILED DESCRIPTION OF PREFERRED EMBODIMENTS

A preferred embodiment of this invention will be described in detail by reference to the drawings. It is noted that the drawings are simplified or transformed as needed, and do not necessarily accurately represent the dimensions and shapes of various elements of the embodiment.

Figure 1:
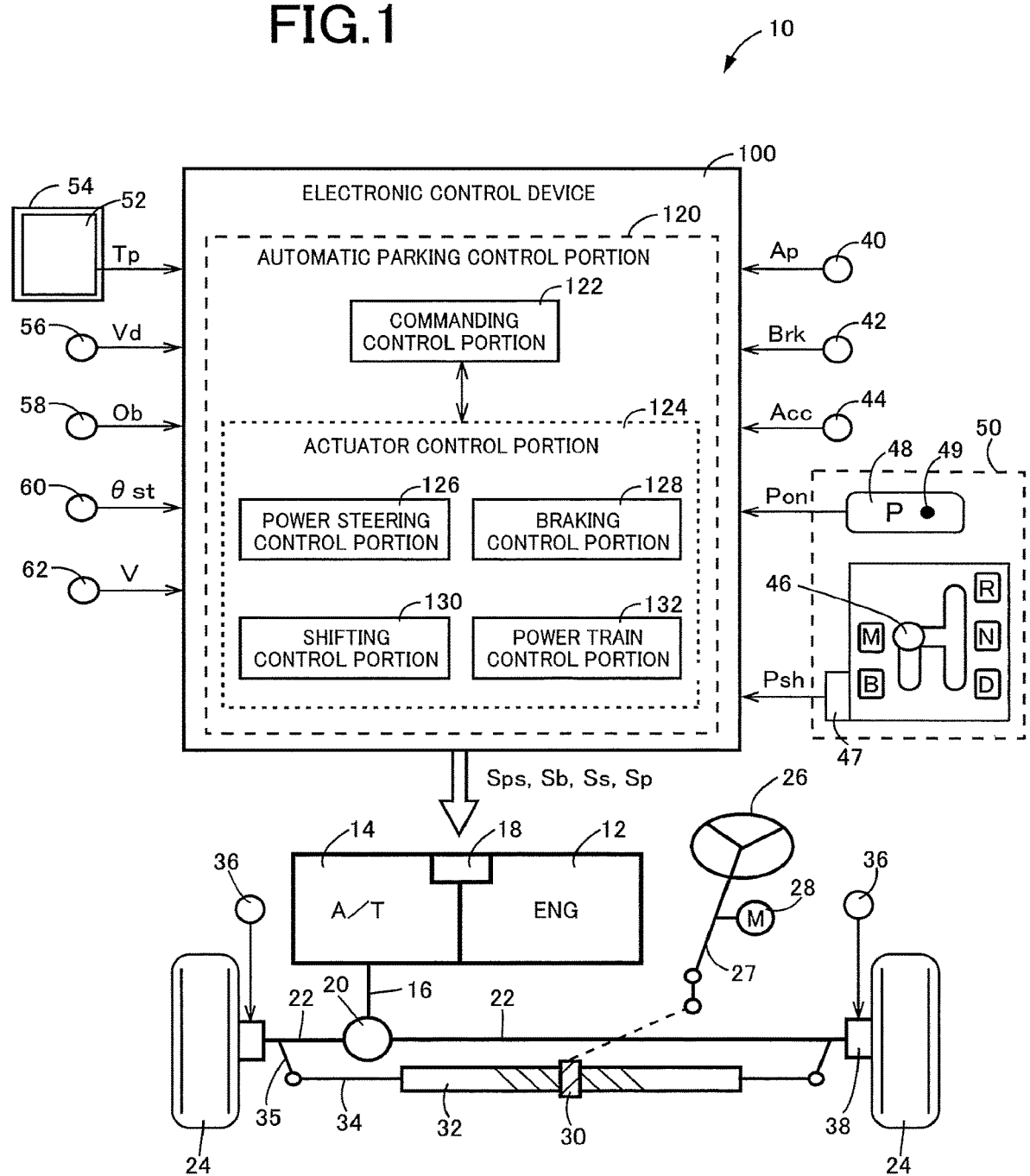
FIG. 1 is a schematic view illustrating an example of an arrangement of a vehicle provided with a control apparatus according to the present invention, the schematic view incorporating a functional block diagram showing an electric control system including an automatic parking control portion.

Reference is first made to FIG. 1, which is the schematic view illustrating an arrangement of a vehicle 10 provided with a control apparatus in the form of an electronic control device 100 according to the present embodiment of the invention. The schematic view incorporates the functional block diagram showing an electric control system including an automatic parking control portion 120. The vehicle 10 is provided with an engine 12 as a drive force source, an automatic transmission 14, a differential gear device 20 meshing with an output gear (not shown) connected to an output shaft 16 of the automatic transmission 14, axles 22, and right and left drive wheels 24. A drive force generated by the engine 12 is transmitted to the automatic transmission 14, and from the automatic transmission 14 to the drive wheels 24 through the differential gear device 20 and the axles 22. The vehicle 10 is further provided with a manual shifting device 50 which is manually operable by an operator of the vehicle 10. The manual shifting device 50 includes a shift lever 46 and a P-switch 48 which respectively generate a shift position signal Psh and a P-switch signal Pon, which are applied as shifting control signals to the electronic control device 100. According to these signals Psh and Pon, the electronic control device 100 commands a shifting device 18 to shift the automatic transmission 14 to a drive position selected according to the shift position signal Psh, or to place a parking lock device 70 in a parking position according to the P-switch signal Pon.

The functional block diagram of FIG. 1 shows major control portions of the electronic control device 100, which are provided to control the engine 12, the automatic transmission 14, and other devices described below. The electronic control device 100 is configured to implement an automatic parking control for automatically parking the vehicle 10, without operations of a steering wheel 26, the manual shifting device 50, a foot brake pedal (not shown) and an accelerator pedal (not shown) by the vehicle operator. The electronic control device 100 is arranged to deal with an operation of the manual shifting device 50 by the vehicle operator to a shift position for driving the vehicle 10 in a direction opposite to a direction of movement of the vehicle 10 during the automatic parking control. For instance, this electronic control device 100 includes a so-called microcomputer incorporating a CPU, a RAM, a ROM, and an input-output interface. The CPU processes input signals according to programs stored in the ROM while utilizing a temporary data storage function of the RAM, to implement various controls.

As shown in FIG. 1, the electronic control device 100 receives various input signals such as: an output signal Ap of an automatic parking control start switch 40 operable by the vehicle operator to start the automatic parking control; an output signal Brk of a brake sensor 42 indicative of an operation and an operating force (N) of the foot brake pedal (not shown); an output signal Acc of an accelerator sensor 44 indicative of an operation amount (Ace: %) of the accelerator pedal, which represents an output of the vehicle 10 required by the vehicle operator; an output signal of a shift position sensor 47 of the manual shifting device 50 in the form of the above-indicated shift position signal Psh indicative of the selected shift position of the shift lever 46, and an output signal of the P-switch 48 in the form of the above-indicated P-switch signal Pon; an output signal Tp of a touch panel 52 which is provided on a screen of a monitor 54 and operable by the vehicle operator; a video output signal Vd of a monitor camera 56 which is a sensor for recognizing the periphery of the vehicle 10; output signals Ob of object detecting sensors 58 indicative of objects surrounding the vehicle 10, which sensors 58 may be millimeter-wave sensors, laser sensors, or ultrasonic sensors, for example; an output signal Ost of a steering angle sensor 60 indicative of a steering angle (Ost: degrees) of the steering wheel 26; and an output signal V of a vehicle speed sensor 62 indicative of a running speed (rpm) of the vehicle 10.

The electronic control device 100 generates various output signals such as: a steering control signal Sps for controlling the steering angle of the steering wheel 26; a braking control signal Sb for controlling a braking force to be applied to the vehicle 10; a shifting control signal Ss for controlling the shifting device 18; a drive force control signal Sp for controlling an output of the engine 12 including a drive signal to control a throttle actuator for operating an electronic throttle valve according to the operation amount Acc of the accelerator pedal, and a fuel injection control signal for controlling an amount of fuel injection by a fuel injecting device; and an ignition timing control signal for controlling timing of ignition of the engine 12 by an igniter.

The steering angle θst of the steering wheel 26 is controlled in the following manner. The steering wheel 26 is fixed to a steering shaft 27, which is rotated by an electric motor 28, so that a pinion 30 connected to a lower end of the steering shaft 27 is rotated, whereby a rack shaft 32 meshing with a gear of the pinion 30 is moved in a transverse direction of the vehicle 10. Tie rods 34 are connected to the opposite ends of the rack shaft 32, and to respective knuckle arms 35 which are connected to the respective axles 22. Movements of the tie rods 34 with the rack shaft 32 in the transverse direction and consequent transverse movements of the knuckle arms 35 cause inclination of the axles 22, whereby the steering angle θst is changed as known in the art. The steering angle θst can be detected by detecting an angle of rotation of the steering shaft 27 or a distance of movements of the rack shaft 32. Braking hydraulic cylinders 36 are provided to actuate wheel brakes 38. A hydraulic pump or an accumulator (not shown) is provided as a hydraulic pressure source, and a hydraulic pressure to be applied from the hydraulic pressure source, which is also used for an anti-lock braking system (ABS), to the braking hydraulic cylinders 36 is controlled on the basis of the braking control signal Sb which is generated according to the output signal Brk of the brake sensor 42 indicative of the operating force (N) acting on the foot brake pedal. Accordingly, the wheel brakes 38 generate a braking force corresponding to the operating force (N).

The manual shifting device 50 including the shift lever 46 and the P-switch 48 is indicated by a dashed line in FIG. 1, by way of example. For instance, the manual shifting device 50 is located near an operator's seat within the vehicle 10. The shift lever 46 is of a momentary operation type having a plurality of shift positions. The momentary operation type shift lever 46 is automatically returned to a predetermined neutral position (position "M") when the shift lever 46 is released by the vehicle operator. The manual shifting device 50 has a parking position "P" selected by the P-switch 48, as well as the shift positions of the shift lever 46.

Described more specifically referring to FIG. 1, the shift lever 46 has two mutually parallel paths of movement, which are parallel to the longitudinal or vertical direction of the vehicle 10. Along one of the two paths, there are provided a reverse drive position "R", a neutral position "N" and a forward drive position "D". Along the other path, there are provided the position "M" and a braking position "B". The shift position signal Psh indicative of the presently selected shift position of the shift lever 46 is generated from the shift position sensor 47 and applied to the electronic control device 100. The shift lever 46 is operable in the longitudinal direction between the reverse drive position "R" and the neutral position "N" and between the neutral position "N" and the forward drive position "D", and between the position "M" and the braking position "B". Further, the shift lever 46 is operable in the transverse direction of the vehicle 10, between the neutral position "N" and the position "M". The neutral position "N", forward drive position "D", reverse drive position "R", and braking position "B" may also be referred to as a neutral range "N", forward drive range "D", reverse drive range "R", and engine braking range "B", respectively. In this description, the neutral range "N", forward drive range "D", reverse drive range "R", and engine braking range "B" may be used as control modes respectively selected by the electronic control device 100 based on the determination of the neutral position "N", forward drive position "D", reverse drive position "R", and braking position "B".

The shift positions of the shift lever 46 will be further described. In the reverse drive position "R", a reverse drive force is transmitted to the drive wheels 24 to drive the vehicle 10 in the reverse direction. In the neutral position "N", the automatic transmission 14 is placed in its neutral state, namely, a power transmitting path within the automatic transmission 14 is placed in a power-cutoff state. In the forward drive position "D", a forward drive force is transmitted to the drive wheels 24 to drive the vehicle 10 in the forward direction. In the braking position "B", an engine braking is applied to the drive wheels 24 for deceleration of the vehicle 10 running in the forward drive position "D".

The P-switch 48 is a pushbutton switch of a momentary operation type. Each time the P-switch 48 is pressed, the P-switch signal Pon is applied to the electronic control device 100. When the P-switch 48 is pressed while the shifting device 18 is not placed in the parking position P, the electronic control device 100 commands the shifting device 18 to be placed in the parking position P, if predetermined conditions are satisfied, for instance, if the vehicle 10 is held substantially stationary. In the parking position P, the vehicle 10 is placed in a parking lock state in which the drive wheels 24 are mechanically locked with the parking lock device 70. The P-switch 48 incorporates a P-position indicator 49 which is illuminated when the manual shifting device 50 is placed in the parking position P.

Figure 2:
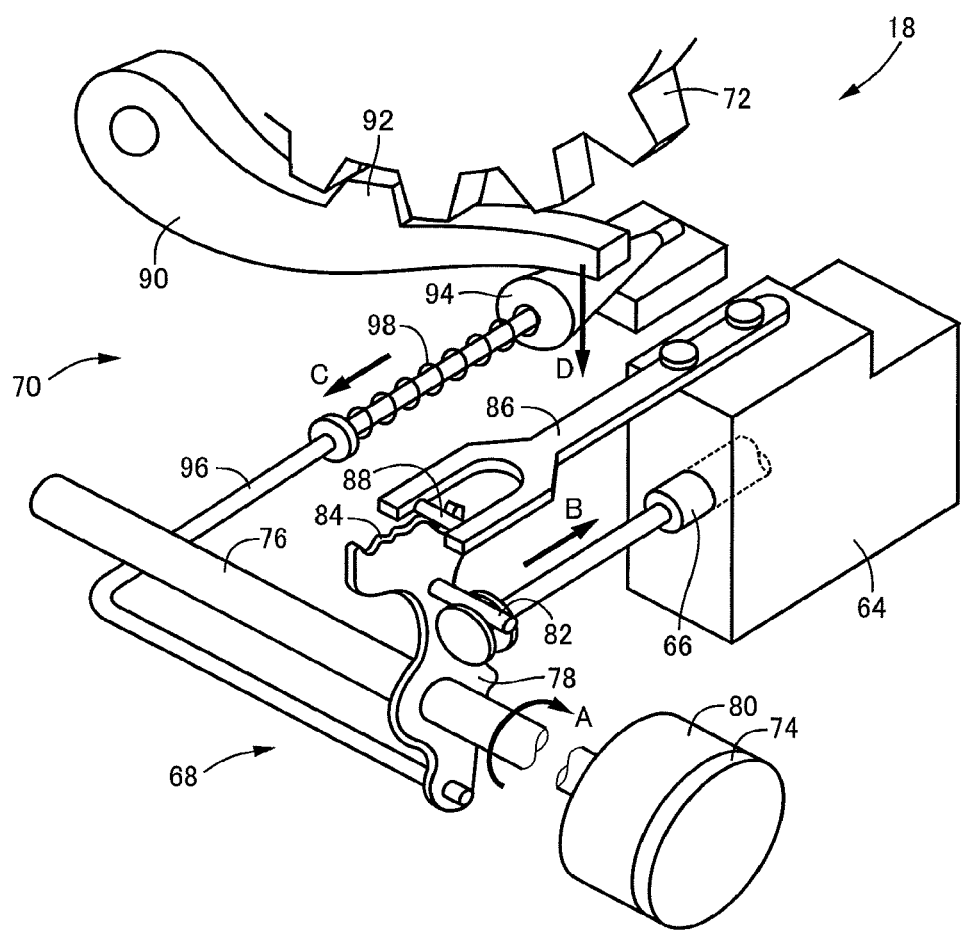
FIG. 2 is a perspective view showing an arrangement of a shifting device for shifting an automatic transmission shown in FIG. 1.

FIG. 2 is the perspective view showing an arrangement of the shifting device 18, which includes a shift position switching device 68 for shifting the automatic transmission 14 shown in FIG. 1, and the parking lock device 70 for locking the output shaft 16 of the automatic transmission 14. The shifting device 18 employs a shift-by-wire system configured to shift the automatic transmission 14 according to the shifting control signal Ss generated from the electronic control device 100 on the basis of the shift position signal Psh indicative of the selected shift position of the shift lever 46 and the P-switch signal Pon indicative of an operation of the P-switch 48.

The shifting device 18 is provided with: a stepping motor 80 functioning as a shift actuator which is operated according to the shifting control signal Ss generated from the electronic control device 100 on the basis of the shift position signal Psh generated according to an operation of the shift lever 46 (shown in FIG. 1) by the vehicle operator, and the P-switch signal Pon generated according to an operation of the P-switch 48 by the vehicle operator; a manual shaft 76 connected to an output shaft of the stepping motor 80 through a speed reducing device, for example; and a detent plate 78 in the form of a plate which is fixed to the manual shaft 76 and held in engagement with a spool 66 of a manual valve 64 and which is pivotable to a selected one of a plurality of angular positions corresponding to respective predetermined axial operating positions of the spool 66 which correspond to the respective shift positions of the manual shifting device 50. An operating position of the stepping motor 80, namely, a rotary position (angle) of a rotor of the stepping motor 80 is detected by a rotary encoder 74.

The detent plate 78 is provided with a spool engaging rod 82 which is held in engagement with the spool 66 such that the spool 66 is axially moved when the detent plate 78 is rotated about the manual shaft 76. Further, the detent plate 78 has a cam surface 84 formed on its upper end periphery, to hold the spool 66 at a selected one of its predetermined axial operating positions. That is, the cam surface 84 has a recess for holding the spool 66 in its axial operating position corresponding to the parking position P, and recesses corresponding to the reverse drive position R, the neutral position N and the forward drive position D. The cam surface 84 is held in abutting contact with an engaging roller 88 which is rotatably supported in a free or distal end portion of a sheet spring 86 that is fixed at its proximal end portion. This sheet spring 86 holds the engaging roller 88 in pressing contact with the cam surface 84. Thus, the detent plate 78 is kept at one of its plurality of angular positions with the engaging roller 88 being held in engagement with one of the recesses of the cam surface 84, so that the spool 66 is held in one of its plurality of axial operating positions corresponding to the respective shift positions.

The parking lock device 70 is provided with: a parking gear 72 fixed to the output shaft 16 of the automatic transmission 14 shown in FIG. 1; a parking lock pawl 90 which is disposed pivotably about an axis toward and away from the parking gear 72 and which has a tooth 92 engageable with the parking gear 72 to lock the output shaft 16 for preventing its rotary motion when the parking lock pawl 90 is pivoted toward the parking gear 72; a parking rod 96 which has a tapered member 94 fixed at its one end portion such that the tapered member 94 is held in abutting contact with the parking lock pawl 90; and a spring 98 for biasing the tapered member 94 in a direction from a large-diameter end of the tapered member 94 toward its small-diameter end. The parking rod 96 is connected at its other end portion to a lower end of the detent plate 78, so that the tapered member 94 is axially moved in opposite directions toward the respective small-diameter and large-diameter ends, when the detent plate 78 is pivoted in respective opposite directions.

FIG. 2 shows the detent plate 78 placed in its angular position corresponding to the parking position P. In this angular position of the detent plate 78, the spool 66 of the manual valve 64 is located at a position corresponding to the parking position P of the manual shifting device 50, while the tooth 92 of the parking lock pawl 90 is held in engagement with the parking gear 72, so that the output shaft 16 is locked. When the stepping motor 80 is operated to rotate the manual shaft 76 in a direction indicated by an arrow-headed line A in FIG. 2, in the above-indicated angular position of the detent plate 78, the spool 66 is moved in a direction indicated by an arrow-headed line B, to a position corresponding to one of the shift positions of the shift lever 46, while a portion of the parking rod 96 on the side of the tapered member 94 is moved in a direction indicated by an arrow-headed line C, together with the tapered member 94 fixed to its above-indicated one end portion, so that the parking lock pawl 90 is pivoted in a direction indicated by an arrow-headed line D. As a result, the tooth 92 of the parking lock pawl 90 is disengaged from the parking gear 72, whereby the output shaft 16 is unlocked.

Referring back to FIG. 1, there are shown major electronic control portions of the electronic control device 100, for implementing the automatic parking control of the vehicle 10. The automatic parking control portion 120 indicated by a dashed line includes a commanding control portion 122, and an actuator control portion 124 indicated by a broken line. The actuator control portion 124 is provided with a power steering control portion 126, a braking control portion 128, a shifting control portion 130 and a power train control portion 132.

When the vehicle operator presses the automatic parking control start switch 40 while the vehicle 10 is located near a desired or suitable parking space, an automatic parking control mode is selected. When the automatic parking control mode is selected, the commanding control portion 122 determines whether there is an available nearby parking space in which the vehicle 10 can be parked, and selects it as a suitable parking space. These determination and selection are automatically made on the basis of the output signals Ob of the object detecting sensors 58, where predetermined conditions are satisfied, for instance, where the vehicle running speed is not higher than a predetermined upper limit, for example, 15 km/h, where the manual shifting device 50 is not placed in the reverse drive position R or the parking position P, and where the automatic parking control start switch 40 has been pressed. In this respect, it is noted that either "parallel parking" to park the vehicle 10 in parallel with the direction of running on a roadway or "garage parking" to park the vehicle 10 in a garage by a reverse movement of the vehicle 10 is selected by the number of pressing operations of the automatic parking control start switch 40 by the vehicle operator, for instance, or may be selected by an operation of the vehicle operator on the touch panel 52 on the screen of the monitor 54.

When the commanding control portion 122 has determined that there is a parking space available for the garage parking, the commanding control portion 122 commands a speaker and the monitor 54 to audibly and visually notify the vehicle operator that there is the available parking space, to prompt the vehicle operator to slowly drive the vehicle 10 in the forward direction from the location of the notification, and to inform the vehicle operator of an appropriate direction of rotation of the steering wheel 26 and its steering angle θst, for thereby guiding the vehicle operator to drive the vehicle 10 to a standby position for the garage parking. After guiding the vehicle operator to drive the vehicle 10 to the standby position, the commanding control portion 122 commands the speaker and the monitor 54 to audibly and visually instruct the vehicle operator to then stop the vehicle 10, to rotate the steering wheel 26 to a straight forward position so as to drive the vehicle 10 in a straight forward direction, and to operate the shift lever 46 to the reverse drive position R. Further, the commanding control portion 122 combines image data of a scene on the rearward of the vehicle 10 obtained by the monitor camera 56, with information on the parking space detected by the object detecting sensors 58, to more accurately recognize the parking space in question and its surroundings. After the vehicle 10 has been stopped with the steering wheel 26 returned to the straight forward position and with the shift lever 46 operated to the reverse drive position R, the vehicle operator presses a touch switch on the touch panel 52 on the screen of the monitor 54, for selecting automatic garage parking of the vehicle 10, so that the output signal Tp of the touch panel 52 is applied to the commanding control portion 122, whereby the automatic parking control has become ready. Then, the commanding control portion 122 commands the actuator control portion 124 to initiate the automatic parking control, namely, commands the power steering control portion 126 for controlling the steering angle θst of the vehicle 10, the braking control portion 128 for controlling the braking of the vehicle 10, the power train control portion 132 for controlling the engine 12 and the automatic transmission 14 to control the vehicle drive force, and the shifting control portion 130 for controlling the shifting device 18 (for shifting the automatic transmission 14).

The shifting control portion 130 controls the shifting device 18 (automatic transmission 14) according to the shifting control signal Ss received from the commanding control portion 122, to shift the automatic transmission 14. If the shift lever 46 is operated to a shift position for driving the vehicle 10 in a direction opposite to a direction of movement of the vehicle during the automatic parking control, for example, if the shift lever 46 is operated by the vehicle operator to the forward drive position D for forward driving of the vehicle 10, during the automatic parking control while the shift lever 46 is placed in the reverse drive position R for reverse driving of the vehicle 10 or if the shift lever 46 is operated by the vehicle operator to the reverse drive position R during the automatic parking control while the shift lever 46 is placed in the forward drive position D, the shifting control portion 130 once brings the automatic transmission 14 into its neutral position N, and notifies the commanding control portion 122 that the shift position represented by the shift position signal Psh received from the shift position sensor 47 has been changed to drive the vehicle 10 in the direction opposite to the direction of the present movement during the automatic parking control. If the P-switch 48 is operated to select the parking position P during the automatic parking control, too, the shifting control portion 130 once brings the automatic transmission 14 into its neutral position N, and notifies the commanding control portion 122 that the P-switch signal Pon has been generated from the P-switch 48. When a predetermined length of time to has passed, the shifting control portion 130 switches the shifting device 18 or the automatic transmission 14 to the drive position or parking position P selected by the vehicle operator, according to the command signal from the commanding control portion 122.

As long as the shift lever 46 is not operated by the vehicle operator to change the shift position during the automatic parking control, the automatic parking control is continued, and the vehicle 10 is stopped when the vehicle operator depresses the foot brake pedal at a desired position. It is noted that the running speed V of the vehicle 10 during the automatic parking control is regulated by an operation of the foot brake pedal by the vehicle operator.

Figure 3:
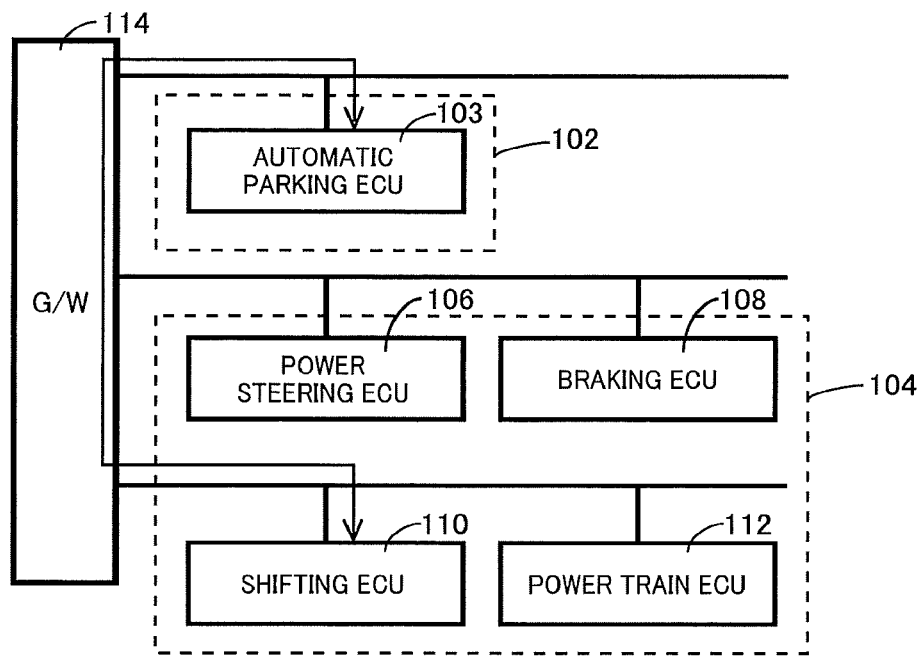
FIG. 3 is a functional block diagram showing major control units which are incorporated in an electronic control device shown in FIG. 1, to implement an automatic parking control of the vehicle.

FIG. 3 is the functional block diagram showing major control units which are incorporated in the electronic control device 100. A parking command control portion 102 corresponding to the commanding control portion 122 shown in FIG. 1 is constituted by an automatic parking ECU 103. An actuator portion 104 corresponding to the actuator control portion 124 shown in FIG. 1 is constituted by a power steering ECU 106, a braking ECU 108, a shifting ECU 110 and a power train ECU 112, which respectively correspond to the power steering control portion 126, the braking control portion 128, the shifting control portion 130 and the power train control portion 132 which are shown in FIG. 1. The automatic parking ECU 103 recognizes the periphery of the vehicle 10 and determines the parking space and a route to the parking space, on the basis of the output signal Vd of the monitor camera 56 and the output signals Ob of the object detecting sensors 58. On the basis of these recognition and determination, the automatic parking ECU 103 applies to the actuator portion 104 control commands for steering control commands, braking control commands, shifting control commands and drive force control commands. The control commands are transmitted to the ECUs 103, 106, 108, 110 and 112 through a gateway 114 and respective CAN buses. The four ECUs 106, 108, 110 and 112 of the actuator portion 104 are connected to respective actuators capable of implementing respective steering, braking, shifting and drive force controls, and are configured to receive information necessary for the respective controls. For example, the power steering ECU 106 receives the steering angle θst from the steering angle sensor 60, and the braking ECU 108 receives the operating force (N) of the foot brake pedal represented by the output signal Brk of the brake sensor 42, while the shifting ECU 110 receives the shift position signal Psh and the P-switch signal Pon from the shift position sensor 47 and the P-switch 48. Further, the power train ECU 112 receives the running speed signal V from the vehicle speed sensor 62, and an operating speed and other information on the engine 12. Thus, the four ECUs 106, 108, 110 and 112 of the actuator portion 104 control the respective actuators on the basis of the information received from the above-indicated sensors 60, 42, 47 and 62 and P-switch 48, in order to satisfy the requirements received from the automatic parking ECU 103.

When the vehicle operator operates the shift lever 46 or the P-switch 48 during the automatic parking control, the shift position signal Psh or the P-switch signal Pon is applied to the shifting ECU 110, so that the shifting ECU 110 once places the automatic transmission 14 in the neutral position N, and notifies the automatic parking ECU 103 through the gateway 114 that the received shift position signal Psh or the P-switch signal Pon should be given overriding priority than the commands from the automatic parking ECU 103. As a result, the automatic parking ECU 103 commands the four ECUs 106, 108, 110 and 112 to control the respective actuators, on the basis of the steering angle θst, the foot brake pedal operating force (N), the vehicle drive force, and the shift position signal Psh or the P-switch signal Pon generated as a result of the operation of the shift lever 46 or the P-switch 48 by the vehicle operator.

FIG. 4 is the flow chart illustrating a major control operation performed by the electronic control device 100, that is, a control routine executed in the process of the automatic parking control, to deal with an operation of the shift lever 46 to a shift position for driving the vehicle 10 in a direction opposite to a direction of movement of the vehicle 10, or an operation of the P-switch 48 to select the parking position P, during the automatic parking control. This control routine is repeatedly executed with an extremely short cycle time of about several milliseconds to about several tens of milliseconds, for instance.

The control routine illustrated in FIG. 4 is executed after initiation of an automatic control of the vehicle 10, namely, after the vehicle 10 has been stopped with the steering wheel 26 returned to the straight forward position and with the shift lever 46 operated to the reverse drive position R, and after the vehicle operator has pressed the touch switch on the touch panel 52 on the screen of the monitor 54, for selecting the automatic garage parking of the vehicle 10, so that the output signal Tp of the touch panel 52 is applied to the commanding control portion 122, whereby the automatic parking control has become ready. The control routine is initiated with a step S10 corresponding to the function of the commanding control portion 122, to determine whether the automatic parking control is being implemented. If a negative determination is obtained in the step S10, that is, if the automatic parking control is not being implemented, one cycle of execution of this control routine is terminated, and the control routine is again initiated with the step S10. If an affirmative determination is obtained in the step S10, the control flow goes to a step S20 corresponding to the function of the shifting control portion 130, to determine whether the vehicle operator has operated the shift lever 46 to a shift position for driving the vehicle 10 in a direction opposite to a direction of movement of the vehicle 10 during the automatic parking control, or has operated the P-switch 48 to select the parking position P. If a negative determination is obtained in the step S20, the control flow goes to a step S40 corresponding to the function of the commanding control portion 122, to continue the automatic parking control. Then, the control flow goes to a step S60 corresponding to the function of the commanding control portion 122, to determine whether the automatic parking control is completed. If a negative determination is obtained in the step S60, that is, if the automatic parking control is continued, the control flow goes back to the step S20. If an affirmative determination is obtained in the step S60, that is, if the automatic parking control is completed, one cycle of execution of the present control routine is terminated, and the control routine is again initiated with the step S10. If an affirmative determination is obtained in the step S20, that is, if the vehicle operator has operated the shift lever 46 to the shift position for driving the vehicle 10 in the direction opposite to the direction of movement of the vehicle 10 during the automatic parking control, or has operated the P-switch 48 to select the parking position P, the control flow goes to a step S30 corresponding to the function of the shifting control portion 130, to place the automatic transmission 14 in the neutral position N, namely, in a power-cutoff state in which a drive force is not transmittable from the engine 12 to the drive wheels 24. Further, the shifting control portion 130 notifies the commanding control portion 122 that the shift lever 46 has been operated by the vehicle operator to the shift position for driving the vehicle 10 in the direction opposite to the direction of movement of the vehicle 10 during the automatic parking control, or the P-switch 48 has been operated by the vehicle operator to select the parking position P. Then, the control flow goes to a step S50 corresponding to the function of the commanding control portion 122, to command the shifting control portion 130 to place the automatic transmission 14 in the drive position or parking position P according to the shift position signal Psh or the P-switch signal Pon, and to command the power train control portion 132 to reduce the vehicle drive force. The shifting control portion 130 and power train control portion 132 are included in the actuator control portion 124.

FIG. 5 is the time chart indicating an example of changes of states of various signals generated from the electronic control device 100 when the shift lever 46 is operated by the vehicle operator to the shift position for driving the vehicle 10 in the direction opposite to the direction of movement of the vehicle 10 during the automatic parking control. In this example, the shift lever 46 is operated to the reverse drive position R by the vehicle operator at a point of time t1 during forward running of the vehicle 10 in the process of the automatic parking control, so that the shift position signal Psh is applied to the shifting ECU 110, namely, to the shifting control portion 130. At a point of time t2, the shifting ECU 110, namely, the shifting control portion 130 commands the shifting device 18 to place the automatic transmission 14 in the neutral position N, and notifies the automatic parking ECU 103, namely, the commanding control portion 122 that the operation of the shift lever 46 by the vehicle operator should be given overriding priority over an automatic parking command applied to the automatic parking ECU 103. At a point of time t3, the automatic parking ECU 103, namely, the commanding control portion 122 requires the shifting ECU 110, namely, the shifting control portion 130 to shift the automatic transmission 14 to the reverse drive position R according to the operation of the shift lever 46 by the vehicle operator. At a point of time t4, the shifting ECU 110, namely, the shifting control portion 130 commands the automatic transmission 14 to be shifted to the reverse drive position R, and terminates the notification to the commanding control portion 122 that the operation of the shift lever 46 should be given the overriding priority. It is noted that a length of time to between the points of time t2 and t4, for which the automatic transmission 14 is held in the neutral position N, is set so as to reduce a shock of switching of the automatic transmission 14 from the neutral position N to the reverse drive position R, by a predetermined degree.

FIG. 6 is the time chart indicating an example of changes of states of the various signals generated from the electronic control device 100 when the P-switch 48 is operated by the vehicle operator to select the parking position P during the automatic parking control. In this example, the P-switch 48 is operated to select the parking position P by the vehicle operator at a point of time al during forward running of the vehicle 10 in the process of the automatic parking control, so that the P-switch signal Pon is applied to the shifting ECU 110, namely, to the shifting control portion 130. At a point of time t12, the shifting ECU 110, namely, the shifting control portion 130 commands the automatic transmission 14 to be placed in the neutral position N, and notifies the automatic parking ECU 103, namely, the commanding control portion 122 that the operation of the P-switch 48 by the vehicle operator should be given overriding priority over an automatic parking command applied to the automatic parking ECU 103. At a point of time t13, the automatic parking ECU 103, namely, the commanding control portion 122 requires the shifting ECU 110, namely, the shifting control portion 130 to shift the automatic transmission 14 to the parking position P according to the operation of the P-switch 48 by the vehicle operator. At a point of time t14, the shifting ECU 110, namely, the shifting control portion 130 commands the automatic transmission 14 to be shifted to the parking position P, and terminates the notification to the commanding control portion 122 that the operation of the P-switch 48 should be given the overriding priority.

The electronic control device 100 according to the present embodiment is adapted to control the vehicle 10 provided with the drive wheels 24, the automatic transmission 14, and the manual shifting device 50 for shifting the automatic transmission 14. The electronic control device 100 includes the automatic parking control portion 120 configured to implement the automatic parking control for automatically parking the vehicle 10 in a predetermined parking space, and controls the automatic transmission 14 to be shifted according to the shifting control signal in the form of the shift lever signal Psh indicative of the selected shift position of the shift lever 46 of the manual shifting device 50, or the P-switch signal Pon indicative of an operation of the P-switch 48 of the manual shifting device 50 to select the parking position P. The automatic parking control portion 120 comprises the shifting control portion 130 configured to place the automatic transmission 14 in the neutral position N, namely, in the power-cutoff state in which the vehicle drive force is not transmittable to the drive wheels 24, when the manual shifting device 50 is operated to a position different from a position in which the automatic parking control is implemented. After the automatic transmission 14 is once placed in the power-cutoff state, the automatic transmission 14 is placed in the drive position or parking position selected according to the operation of the shift lever 46 or the P-switch 48. Accordingly, it is possible to avoid a state of emergency of the vehicle 10 according to an operation of the manual shifting device by the vehicle operator, irrespective of whether the foot brake pedal is operated by the vehicle operator or not. In addition, it is possible to easily reduce generation of a shock upon the operation of the manual shifting device 50, by once placing the automatic transmission 14 in the neutral position N or power-cutoff state, and by regulating the vehicle drive force under the control of the commanding control portion 122.

While the preferred embodiment of this invention has been described above in detail, it is to be understood that the invention may be otherwise embodied.

In the illustrated embodiment, the automatic parking control is initiated after the vehicle driver is guided by the commanding control portion 122 to drive the vehicle 10 to a standby position at which it is considered that the automatic parking control has become ready. However, where the vehicle operator selects the automatic parking control after the vehicle has been stopped near a parking space desired by the vehicle operator, the automatic parking control may include a determination by the commanding control portion 122 as to whether the vehicle 10 can be automatically parked in the above-indicated parking space, and an operation of the commanding control portion 122 to guide the vehicle operator to drive the vehicle 10 to the above-indicated standby position. If the shift lever 46 is operated by the vehicle operator to the shift position for driving the vehicle 10 in the direction opposite to the direction of movement of the vehicle during the automatic parking control described just above, the automatic transmission 14 is once placed in the neutral position N and then shifted to the drive position corresponding to the shift position of the shift lever 46, as in the illustrated embodiment, so that the same advantage as in the illustrated embodiment can be obtained.

In the illustrated embodiment, the parking space is automatically determined and selected in response to an operation of the automatic parking control start switch 40 by the vehicle operator. However, the parking space may be selected according to an operation of the vehicle operator to select the parking space displayed on the monitor 54.

In the illustrated embodiment, the drive force to drive the vehicle 10 is transmitted from the drive power source in the form of the engine 12 to the differential gear device 20 and the drive wheels 24 through the shifting device 18 and the automatic transmission 14. However, the drive power source may include a motor/generator functioning as an electric motor and an electric generator, in addition to the engine 12. Further, a fluid-operated power transmitting device in the form of a torque converter may be disposed between the engine 12 and the shifting device 18.

In the illustrated embodiment, the shift lever 46 has not only the forward drive position D, the neutral position N and the reverse drive position R, but also the braking position B in which engine braking is applied to the drive wheels 24 so as to reduce rotating speeds of the drive wheels 24. However, the shift lever 46 may have a manual shifting position in which the automatic transmission 14 can be shifted by a manual shifting operation by the vehicle operator. Further, the braking position B may be replaced by the manual shifting position.

The shift lever 46 is of the momentary operation type, which is automatically returned to its neutral position (position "M") when the shift lever 46 is released by the vehicle operator. However, the shift lever 46 may be of an alternate operation type, which is kept in one of its shift position, once it has been selected.

In the illustrated embodiment, the shift lever 46 is used as a manually operated shifting member. However, the shift lever 46 may be replaced by shifting pushbuttons or switches. Alternatively, the shifting pushbuttons or switches may be provided in addition to the shift lever 46.

It is to be understood that the preferred embodiment and its modifications described above are provided for illustrative purpose only, and that the invention may be embodied with various other changes and improvements which may occur to those skilled in the art.

NOMENCLATURE OF ELEMENTS

10: Vehicle
18: Shifting device
24: Drive wheels
50: Manual shifting device
80: Stepping motor (Shift actuator)
100: Electronic control device (Control apparatus)
120: Automatic parking control portion
122: Commanding control portion
130: Shifting control portion
Psh, Pon: Shifting control signals

What is claimed is:

1. A control apparatus for a vehicle provided with drive wheels, an automatic transmission, and a manual shifting device for shifting the automatic transmission, the control apparatus including an automatic parking control portion configured to implement an automatic parking control for automatically parking the vehicle in a predetermined parking space, and controlling the automatic transmission to be shifted according to a shifting control signal corresponding to an operation of the manual shifting device, the automatic parking control portion comprising:
   a shifting control portion configured to place the automatic transmission in a power-cutoff state in which a vehicle drive force is not transmitted to the drive wheels, when the manual shifting device is operated to a position a running direction in which is different from a running direction of the vehicle when the automatic parking control is implemented.

2. The control apparatus according to claim 1, wherein the shifting control portion commands the automatic transmission to be placed in a running position or a parking position according to the shifting control signal corresponding to the operation of the manual shifting device, after the automatic transmission is once placed in the power-cutoff state.

3. The control apparatus according to claim 2, wherein the shifting control portion controls a shifting device including a shift actuator configured to shift the automatic transmission, and the automatic parking control portion further comprises a commanding control portion configured to control the shifting control portion,
   and wherein the shifting control portion commands the shifting device to place the automatic transmission in a neutral position when the manual shifting device is operated to a shift position for driving the vehicle in a direction opposite to a direction of movement of the vehicle during the automatic parking control implemented under the control of the automatic parking control portion, the commanding control portion then requiring the shifting control portion to command the shifting device to shift the automatic transmission to a drive position corresponding to the shift position of the manual shifting device, and the shifting control portion then commanding the shifting device to shift the automatic transmission to said drive position.

4. The control apparatus according to claim 3, wherein the shifting control portion controls the shifting device including the shift actuator configured to shift the automatic transmission, and the automatic parking control portion further comprises the commanding control portion configured to control the shifting control portion,
   and wherein the shifting control portion commands the shifting device to place the automatic transmission in the neutral position when the manual shifting device is operated from the non-parking position to the parking position during the automatic parking control implemented under the control of the automatic parking control portion, the commanding control portion then requiring the shifting control portion to command the shifting device to shift the automatic transmission to the parking position corresponding to the parking position of the manual shifting device, and the shifting control portion then commanding the shifting device to shift the automatic transmission to said parking position.

5. The control apparatus according to claim 2, wherein the shifting control portion controls a shifting device including a shift actuator configured to shift the automatic transmission, and the automatic parking control portion further comprises a commanding control portion configured to control the shifting control portion,
   and wherein the shifting control portion commands the shifting device to place the automatic transmission in a neutral position when the manual shifting device is operated from a non-parking position to a parking position during the automatic parking control implemented under the control of the automatic parking control portion, the commanding control portion then requiring the shifting control portion to command the shifting device to shift the automatic transmission to a parking position corresponding to the parking position of the manual shifting device, and the shifting control portion then commanding the shifting device to shift the automatic transmission to said parking position.

6. The control apparatus according to claim 1, wherein the shifting control portion controls a shifting device including a shift actuator configured to shift the automatic transmission, and the automatic parking control portion further comprises a commanding control portion configured to control the shifting control portion,
   and wherein the shifting control portion commands the shifting device to place the automatic transmission in a neutral position when the manual shifting device is operated to a shift position for driving the vehicle in a direction opposite to a direction of movement of the vehicle during the automatic parking control implemented under the control of the automatic parking control portion, the commanding control portion then requiring the shifting control portion to command the shifting device to shift the automatic transmission to a drive position corresponding to the shift position of the manual shifting device, and the shifting control portion then commanding the shifting device to shift the automatic transmission to said drive position.

7. The control apparatus according to claim 6, wherein the shifting control portion controls the shifting device including the shift actuator configured to shift the automatic transmission, and the automatic parking control portion further comprises the commanding control portion configured to control the shifting control portion, and wherein the shifting control portion commands the shifting device to place the automatic transmission in the neutral position when the manual shifting device is operated from the non-parking position to the parking position during the automatic parking control implemented under the control of the automatic parking control portion, the commanding control portion then requiring the shifting control portion to command the shifting device to shift the automatic transmission to the parking position corresponding to the parking position of the manual shifting device, and the shifting control portion then commanding the shifting device to shift the automatic transmission to said parking position.

8. The control apparatus according to claim 1, wherein the shifting control portion controls a shifting device including a shift actuator configured to shift the automatic transmission, and the automatic parking control portion further comprises a commanding control portion configured to control the shifting control portion, and wherein the shifting control portion commands the shifting device to place the automatic transmission in a neutral position when the manual shifting device is operated from a non-parking position to a parking position during the automatic parking control implemented under the control of the automatic parking control portion, the commanding control portion then requiring the shifting control portion to command the shifting device to shift the automatic transmission to a parking position corresponding to the parking position of the manual shifting device, and the shifting control portion then commanding the shifting device to shift the automatic transmission to said parking position.

9. A control apparatus for a vehicle provided with drive wheels, an automatic transmission, and a manual shifting device for shifting the automatic transmission, the control apparatus comprising:

an automatic parking control circuitry configured to implement an automatic parking control for automatically parking the vehicle in a predetermined parking space, and to control the automatic transmission to be shifted according to a shifting control signal corresponding to an operation of the manual shifting device, wherein the automatic parking control circuitry has shifting control configured to place the automatic transmission in a power-cutoff state in which a vehicle drive force is not transmitted to the drive wheels, when the manual shifting device is operated to a position a running direction in which is different from a running direction of the vehicle when the automatic parking control is implemented.

* * * * *